United States Patent

[11] 3,627,922

[72] Inventors Peter C. Goldmark; Abraham A. Goldberg, both of Stamford, Conn.

[21] Appl. No. 872,163

[22] Filed Oct. 29, 1969

[45] Patented Dec. 14, 1971

[73] Assignee Columbia Broadcasting System, Inc.

[54] VIDEO FILM CONTAINING INTERMIXED MOVIE AND STILL PICTURE INFORMATION AND REPRODUCING APPARATUS THEREFOR

9 Claims, 3 Drawing Figs.

[52] U.S. Cl. ..... 178/7.2 R, 178/DIG. 28, 178/6.7 R, 250/219 FR

[51] Int. Cl. ..... H04n 5/36

[50] Field of Search ..... 178/DIG. 28, 5.2 D, 6.7 R; 179/100.3 D; 352/6, 8, 92, 167 D; 250/219 FR

[56] References Cited

UNITED STATES PATENTS

| | | | |
|---|---|---|---|
| 2,295,000 | 9/1942 | Morse | 179/100.3 |
| 2,822,429 | 2/1958 | Watson | 179/100.3 |
| 2,890,277 | 6/1959 | Duke | 178/7.2 |
| 3,212,399 | 10/1965 | Walter | 352/92 |
| 3,301,628 | 1/1967 | Hellmund | 352/92 |
| 3,378,635 | 4/1968 | Goldmark et al. | 178/7.2 |

*Primary Examiner*—Richard Murray

*Assistant Examiner*—Peter M. Pecori

*Attorney*—Spencer E. Olson

ABSTRACT: System for reproducing information recorded on a film in a format comprising sections of motion picture sequences intermixed with sequences of still pictures, including means responsive to indicia recorded on the film at transitions from motion picture sequences to still picture sequences for automatically stopping the film at the first still picture of a still sequence. The motion and still sequences are recorded in monochrome as two adjacent successions of picture frames separated by an intermediate strip containing synchronizing indicia (one per frame in the motion sequences) to which optical sensing apparatus in the playback system is responsive. At the transitions, the intermediate strip contains a multiplicity of similar indicia in response to which the sensing apparatus generates a signal having a frequency determined by the spacing of the indicia and the rate of travel of the film during playback of motion sequences. A circuit responsive to this signal actuates a solenoid which, in turn, deenergizes the film drive to stop the film for viewing the still picture.

INVENTORS.
PETER C. GOLDMARK
ABRAHAM A. GOLDBERG
BY
Spencer E. Olson
ATTORNEY

INVENTORS.
PETER C. GOLDMARK
ABRAHAM A. GOLDBERG
BY
ATTORNEY

VIDEO FILM CONTAINING INTERMIXED MOVIE AND STILL PICTURE INFORMATION AND REPRODUCING APPARATUS THEREFOR

BACKGROUND OF THE INVENTION

This invention relates to a video record medium containing intermixed motion picture sequences and still pictures, and particularly to a record medium in this format having indicia thereon to which the playback apparatus is responsive to automatically stop the film at the end of a motion sequence to permit stationary viewing of the still pictures.

In U.S. application Ser. No. 519,106 abandoned in favor of ser. No. 862,564 filed July 25, 1969 which is now abandoned in favor of serial number 61,421 filed Aug. 5, 1970 of Goldmark and Hollywood for "Color Film Recording and Reproducing Apparatus," assigned to the assignee of this invention, there is described a system for recording video information in a motion picture format, with luminance information of a particular scene occupying one frame, or frame portion, and coded color information in the scene occupying an adjacent frame or frame portion. As therein disclosed, the coded color information is a monochrome record of a carrier signal modulated in amplitude and phase in accordance with the saturation and hue of the color component in the original scene, together with a superimposed record of a reference carrier at a different frequency, both frequencies being multiples of the line recording rate. During reproduction, a frame containing the color information is scanned independently or simultaneously with the corresponding luminance frame to derive a color video output signal for application to a television receiver.

U.S. application Ser. No. 776,137 of Goldmark Castrignano, Hollywood and Ridley for "Video Film and Film Recording Apparatus," also assigned to the assignee of this invention, discloses a modification of the above-described film format wherein two adjacent successions of picture frames, one containing luminance information and the other chrominance information, are separated by an intermediate strip containing synchronizing information to be used by scanning apparatus during reproduction. The synchronizing information comprises a narrow window-type mark disposed in the intermediate strip in a precise predetermined location with respect to the frames.

The record medium of the format described in the aforementioned U.S. application Ser. No. 766,137 may instead of containing color information, have two monochrome programs recorded on the adjacent successions of frames. In this case, too, synchronizing indicia positioned in precisely predetermined location with respect to each frame are provided on the intermediate strip so that only a single detecting unit is needed for generating the synchronizing signal upon reproduction, irrespective of the program being reproduced.

A record medium of either of the above-described types can be scanned for reproduction using the technique disclosed in U.S. Pat. No. 3,410,954 which employs a scanning raster having a dimension in the scanning zone equal to twice the pitch distance between adjacent frames of recorded information. The record medium is conveyed continuously through the scanning zone so that each frame moves a distance equal to the dimension of the raster in the scanning zone during each vertical scan. Signals for maintaining synchronism between the rate of movement of the record frames and the scanning zone are derived by sensing the above-described synchronizing indicia recorded in regularly spaced intervals on the film.

The electronic video recording system briefly described above is useful not only for the recording and playback of motion pictures, but admirably lends itself to the recording and presentation of educational or instructional material in the form of sequences of motion pictures intermixed with textual material, still pictures, charts and the like, with the storage in either black and white or color. When using this storage and retrieval medium for instructional purposes, it is desirable to organize the program so as to minimize the requirement for motion, not only to give the user as much time as he wishes (or requires) for observation of a given still picture (which might, for example, contain a page of text from a book or a detailed picture or chart) but also to effect a saving in film and film processing time, thereby to reduce the cost of the medium as an educational tool. For instance, in a medical or art lesson, a particular topic might be introduced by a motion sequence showing an expert in the field who, with as few words as possible on an accompanying sound track, explains a particular item, and then refers to a drawing or diagram to illustrate it. Rather than presenting the drawing or diagram in a motion picture sequence, which in the system described above would consume film at the rate of 6 inches per second, or 30 feet for a diagram requiring a minute of observation for comprehension, they are presented in one or a series of still pictures, each occupying only a single frame of the record medium. However, the film must be stopped to view the diagram, and in order not to waste film footage between a motion picture sequence and a still picture, it is essential that the moving record medium be brought to a standstill in the shortest possible time following the end of the motion sequence. Moreover, when the two tracks of the film contain separate monochrome programs, it is unlikely that they will have precisely the same organization of movie sequences and still frames, making it necessary to stop the film at different places along the film for viewing still frames in the two programs. Although the above-described playback apparatus has provision for manually stopping the film for examination of a single frame of a movie sequence, it is not practical to attempt to manually stop the film at the conclusion of a motion picture sequence to view a still sequence which might consist of but a single frame. Thus, in order to realize the advantages of intermixing moving and still pictures on this form of record medium, it is necessary that the playback apparatus anticipate the arrival of a still frame, be it in one or the other of two monochrome programs or in a color program recorded on both tracks, and stop the film at the correct time to view it.

SUMMARY OF THE INVENTION

To the end of stopping the moving record medium precisely at the end, or at a predetermined time after the end, of a motion picture sequence to permit viewing of a still picture following it, a multiplicity of window-type indicia are positioned on the intermediate strip adjacent the final two or three frames of each motion picture sequence, or adjacent a like number of frames separating the motion picture sequence from a still frame, which when sensed as these frames are transported through the reproducing apparatus, generate a pulse train having a repetition frequency determined by the number of indicia per frame and the velocity of the film. To give the playback apparatus the capability of stopping the film at a still frame in a color program or in either of the two monochrome programs, two different "still stop" cue signals are employed, one being operative to stop the film at a still in a color program or in one of the two monochrome programs, and the other being operative to stop the film at a still frame in the other monochrome program. Signals of uniquely different frequencies are obtained by differently spacing the synchronizing windows for the two cases so as to generate pulse trains of different repetition frequencies as the film is transported at a constant playback speed. A circuit selectively responsive to these signals actuates solenoid that pulls down the "STILL" control button of the playback apparatus which, in turn, is operative to stop the film to permit viewing of the still picture. This control button is of a type that once depressed, remains locked in that position until manually released; consequently only momentary actuation of the solenoid is required. The sensing circuit utilizes a "Q"-multiplying circuit responsive to a short burst of pulses to develop a sharp, high-amplitude solenoid energizing signal with a minimum of components.

In order not to have to collapse the raster of the scanner in the playback apparatus to view the still frame (which would cause greater fatigue over that portion of the screen than the rest due to prolonged viewing of still pictures, resulting in a differential brightness between that portion of the picture and the rest), the still frames are twice as high in the direction of film motion as the frames in the motion picture sequences. However, since manual operation of the STILL control button to view a single frame of a motion picture sequence results in collapsing the raster to half size, means are provided to negate such raster collapse when the STILL button is pulled down in response to signals derived from the film.

BRIEF DESCRIPTION OF THE DRAWINGS

For a further understanding of these and other aspects of the invention, together with further advantages thereof, reference may be made to the following detailed description, taken in conjunction with the drawings, in which.

DESCRIPTION OF THE PREFERRED EMBODIMENT

Figure 1:
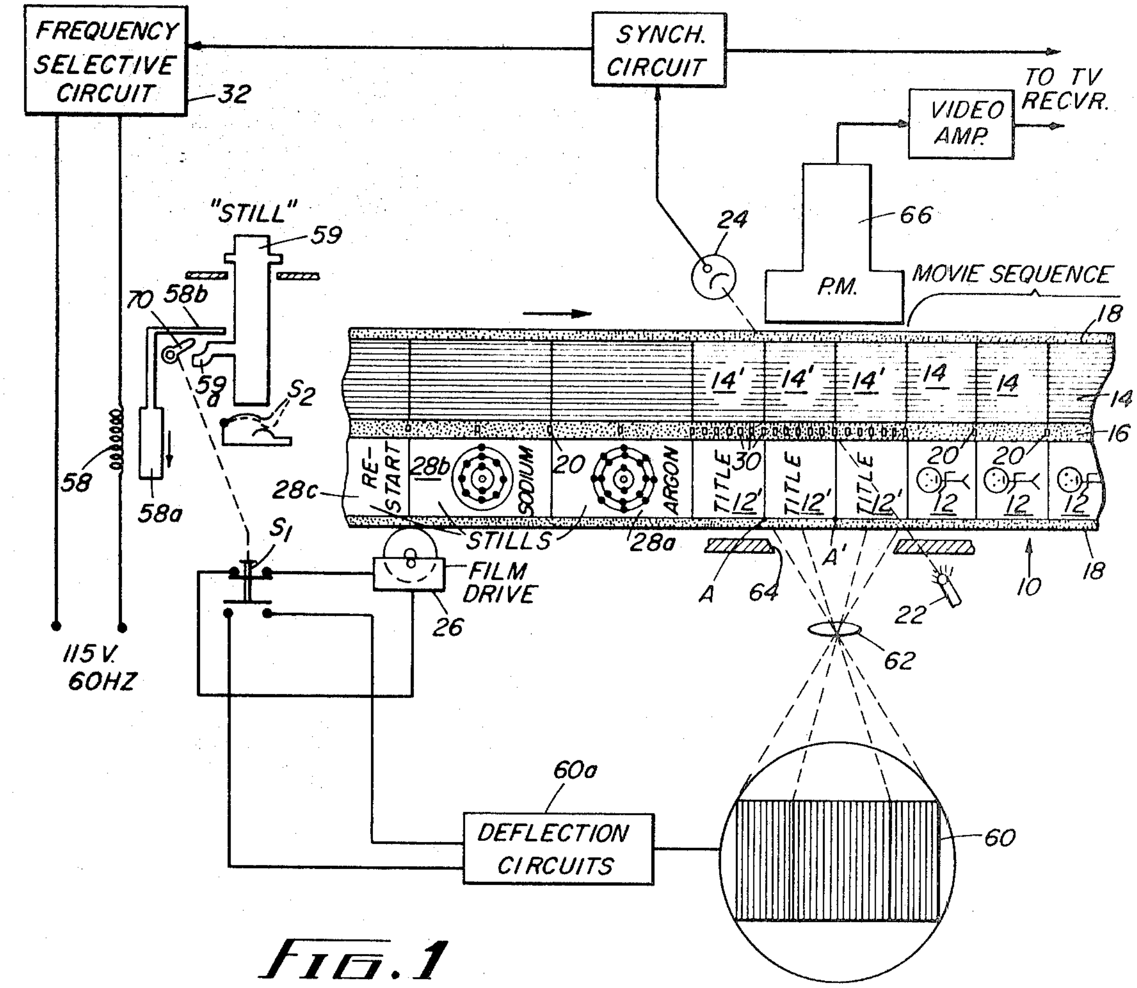
FIG. 1 is a diagrammatic representation of a segment of a film containing a color program recorded with coding indicia in accordance with the invention, shown in operative relation with apparatus for reproducing the film.

FIG. 1 illustrates a segment of film, a portion of which has the format used in the above-described electronic video recording system. The record medium is a transparent photographic strip 10, which may be about 8 mm. wide, and carries a first longitudinal succession of frames 12 separated from a second succession of frames 14 by an opaque intermediate strip 16. In the illustrated embodiment the frames 12 contain a monochrome record of the luminance or brightness information in an original scene, for example a scene from a single frame of an original motion picture film, and the frames 14 contain a coded monochrome representation of the color content of the corresponding scenes in the frames 12. The margins of the film may be used for a sound record, preferably in the form of magnetic tracks 18 recorded with sound information. With motion of the film during playback in the direction indicated by the arrow, the three pairs of frames at the right end would be the final frames of a movie sequence.

Located in the intermediate strip 16 are a series of signal marks or indicia 20 having a precisely fixed longitudinal position relative to the frames 12 and 14, each being preferably aligned with the top edge of the frames (the lines transversely of the film define the top and bottom edges of the frames, as will be better seen later) because it corresponds to the position of the scanning beam at the beginning of each scanned sequence during reproduction. They are located along the centerline of the film so as to be sensed by a detector centered in the film path, which includes a light source 22 directing light through the film to a suitable photosensor 24. It will be noted that the film is not sprocketed, but is instead conveyed during the reproduction by a conventional capstan drive, shown schematically at 26.

Following the movie sequence and separated therefrom by three frames in the illustrated example, although a greater number can be used, the two successions of frames respectively contain luminance and chrominance information of a sequence of three still pictures 28*a*, 28*b* and 28*c*, the subject matter of which would usually be related to the movie sequence from the still sequence (designated 12' and 14') provide the time necessary to bright the film to a stop at the first still picture 28*a* from its normal velocity of 6 inches per second; the frames each being 0.1 inch high in the direction of film motion, the three frames provide 1/20 second to bring the film to standstill at the first still picture 18*a*. In order that the viewing screen not be blank during this period, the three frames in each succession preferably carry the title of the picture, chart or diagram, as the case may be, which is to follow.

In accordance with this invention, the impending arrival of the still frame 28*a* is anticipated by a multiplicity of indicia 30 recorded on that section of intermediate strip 16 encompassed by the three pairs of frames 12', 14'. The indicia 30 are uniformly spaced and may be of the same shape and size as the marks 20. Although the number of marks per frame is not critical other than that there be enough clearly to distinguish from the 60 pulses per second derived from the normal one mark per frame in the movie sequences, in an embodiment which has been successfully operated the indicia are evenly spaced at 7½ per frame. Thus, at the normal playing speed of 6 inches per second, the photosensor 24 senses 450 pulses per second (pps) in this section of the film instead of the 60 pps detected in a movie sequence. This pulse train is applied to a frequency selective circuit 32 which responds to the short burst of pulses at this frequency (22 pulses at most in the example shown) to actuate a solenoid arranged to pull down the normally manually operable STILL control button 59 on the reproducing apparatus. Upon actuation, the STILL control button, the normal function of which is to manually stop the film for still viewing of a single frame in a movie sequence, disengages the film drive 26 to stop the film.

Figure 2:
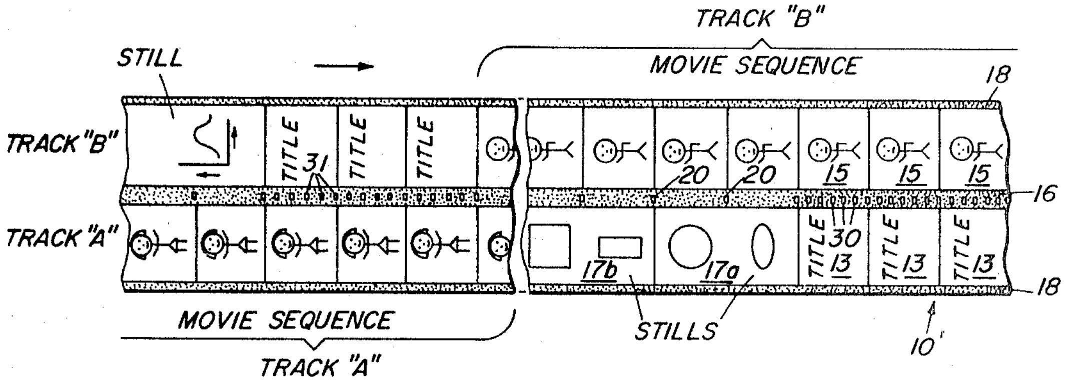
FIG. 2 is a fragmentary plan view of a film containing two monochrome programs recorded with coded indicia in accordance with the invention.

As was noted earlier, in the case of the color program, the frames containing the luminance and chrominance information are necessarily adjacent, for both the movie sequence and the stills, so that when the film is stopped at the first still its program content can be reproduced. However, monochrome films contain separate programs on the two tracks which, unless the programs have exactly the same organization, would have their still sequences located at different places along the length of the film. Thus, a series of indicia 30 located to stop the film at a still in one track cannot be used to stop the film at a still in the other track. More specifically, and as illustrated in FIG. 2, in the case of programs recorded in monochrome, the first longitudinal succession of frames 13 which, for convenience, will be designated track A, contains a monochrome record of one program, and the succession of frames 15 (designated track B) contains a monochrome record of a second independent program. As illustrated, the three frames at the right end of track A separate a just completed movie sequence from a sequence of stills 17*a* and 17*b*. As in the case of the color program, the frames between the movie sequence and the stills may carry a chart or the title of the still picture to come.

As in the case of the film containing a color program, a series of signal marks or indicia 20, having a precisely fixed longitudinal position relative to the frames in the two tracks, are recorded on the opaque intermediate strip 16, for generating suitable synchronizing signals upon reproduction, irrespective of whether track A or B is being reproduced. The impending arrival of the still frame 17*a* in track A is anticipated by a multiplicity of indicia 30 recorded on the intermediate strip adjacent the three frames 13. For reasons which will become apparent, the indicia 30 are of the same size and have the same spacing as for the color film described in FIG. 1, namely, 7½ windows per frame, so as to generate a pulse train at 450 pps as the film as transported at its normal playing speed of 6 inches per second.

It will be noted that the program organization in track B differs from that in track A in that the final frames of its movie sequence overlap and follow the section of the intermediate strip 16 on which the multiplicity of windows 30 associated with track A are recorded. Obviously, then, the coded indicia for stopping the film at a still frame in track A cannot serve to stop the film at the proper place for viewing a still frame in track B. In accordance with another aspect of the invention, a separate still stop cue for track B operative to generate a pulse train at a different frequency is recorded on the intermediate strip 16 ahead of still frames in its program. For example, in an embodiment which has been successfully operated, the multiplicity of windows 31 associated with track B are spaced at five per frame which, at the normal playing speed of 6 inches per second and a frame size of 0.1 inch, generate a pulse train at 300 pps. These recorded indicia are detected in the manner previously described and applied to the same frequency selective circuit 32.

Figure 3:
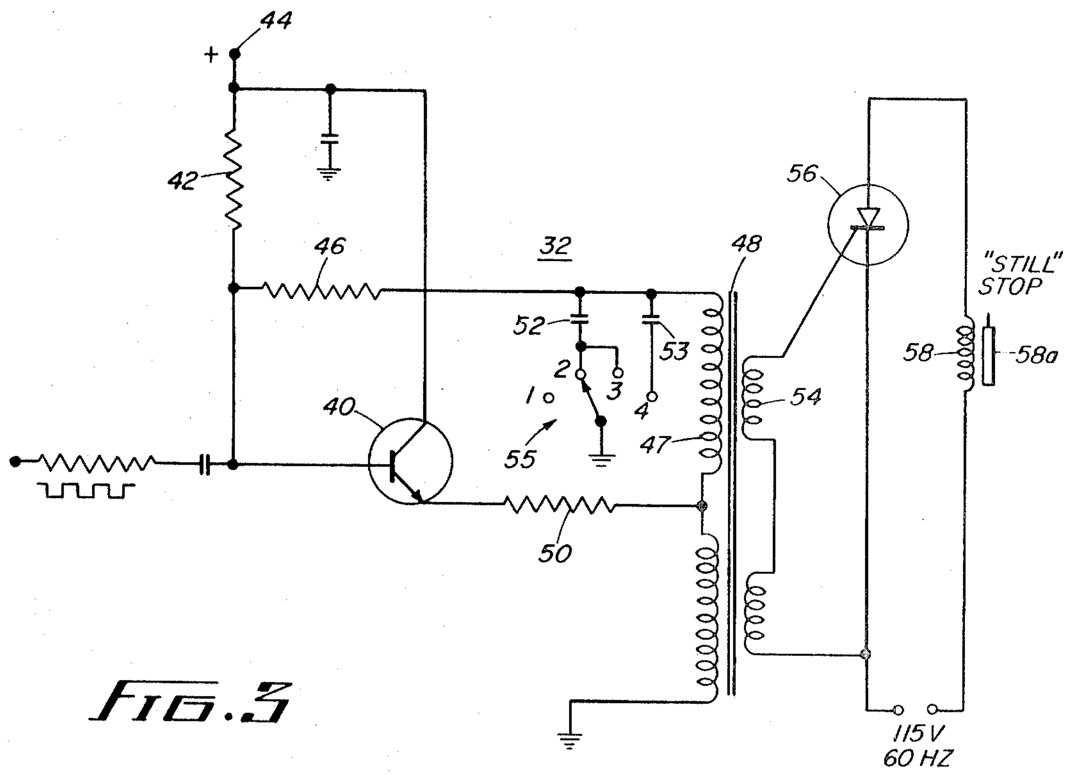
FIG. 3 is a schematic diagram of a circuit operative in response to the coded indicia recorded on the films of either FIG. 1 or FIG. 2.

Referring now to FIG. 3, the circuit 32 for actuating the solenoid is of the type known as a Q-multiplier, including a transistor 40 having its base electrode connected through a resistor 42 to a source of positive potential, represented by terminal 44, and through resistor 46 to one terminal of the primary winding 47 of a transformer 48. The collector electrode of the transistor is directly connected to the source of potential 44, and the emitter is connected through resistor 50 to a tap on primary winding 47. The primary winding 47 together with one or the other of capacitors 52 and 53 selectively connected in parallel therewith by switch 55, constitutes a tank circuit, one side of which is connected in positive feedback relation through resistor 46 to the base of the transistor. For the examples mentioned above, the capacitance of capacitor 52 is so related to the inductance of the primary 46 that the tank circuit is resonant at 450 Hz. and when capacitor 53 is switched into the tank circuit, it is resonant at 300 Hz. By virtue of the positive feedback, the circuit rapidly generates a high-amplitude signal of a frequency corresponding to the repetition rate of the pulse grain applied to the base electrode.

The switch 55 is mechanically ganged with the operating controls of the playback apparatus and is in the position marked "1" when the player is "off". The switch is moved to position "2" when the playback apparatus is set to reproduce color and to position "3" when track A of a black and white film is to be reproduced; it will be noted however, that in both of these positions capacitor 52 is connected in parallel with the primary of the transformer so that the circuit is resonant at 450 Hz. When the player is switched to play back track B of monochrome film switch 55 is moved to position "4" at which capacitor 53 is switched into circuit with the transformer primary to change the frequency of the tank circuit to 300 Hz.

The signal developed in the transformer primary, be it 450 Hz. or 300 Hz. is coupled via the transformer secondary winding 54 to the gate electrode of a silicon controlled rectifier 56 (SCR), which, when the potential of its gate is sufficiently positive with respect to the cathode (which is energized from a 60 Hz. 115-volt source) fires and applies the 60 Hz. voltage across the winding 58 of a solenoid. Upon energization of winding 58, the solenoid armature 58*a*, which is mechanically connected to the STILL button 59, pulls the STILL button down into its actuated position. The SCR conducts only during that portion of a cycle of the 60 Hz. signal that the anode is positive with respect to the cathode; during the next half-cycle the SCR extinguishes, but will fire again during the following half-cycle if the gate electrode is still positive with respect to the cathode. The STILL button 59 is of the type that once depressed remains mechanically locked in that position until pressed a second time; accordingly, only a single, momentary actuation of the solenoid is required.

As was noted earlier, the scanning raster in the playback apparatus, schematically shown at 60 in FIG. 1, has a dimension in the scanning zone defined by a gate 64 (taking into account the multiplying factor of an objective lens 62 interposed between the scanner and the film) equal to twice the pitch distance between adjacent frames of recorded information. The record medium is conveyed continuously through the scanning zone at a rate such that each frame moves a distance equal to one-half the dimension of the raster in the scanning zone during each vertical scan. More particularly, the scanner 60 is a cathode-ray tube having a fluorescent screen over which a cathode ray is caused to scan in known manner by suitable deflection circuits 60*a*. The light spot on the screen is focused by lens 62 onto the film 10 which is moved continuously in the direction of the arrow. The light spot scans lines transversely of the film, with the first line (starting from the right) of a given vertical scan synchronized and focused to illuminate the top of a given frame; for example, a transverse line at point A on one of the frames 14'. As the scanning lines on the cathode-ray tube advance to the left at twice the speed that the film advances to the right, the beam scans the complete frame during the time that point A moves to A'. In order that the first line scanned be at the top of the picture, the pictures go past the gate "feet first." Light passing through the film 10 is collected by an optical system such as a photomultiplier 66 in which video signals are generated for application to a television receiver synchronized with the scanning of the film.

It will be evident from the foregoing that when the film is stopped to view a single frame of a movie sequence it is necessary to collapse the raster size to half of what it is for scanning the moving film to preclude scanning out two images–both squashed in the vertical dimension on the television receiver screen. Accordingly, the STILL control button is adapted, when manually depressed, to operate a switch in the deflection circuit 60*a* which, in turn, is operative to collapse the raster to half size, as represented by the two heavier lines on the raster 60, so as to scan a single frame. The playback apparatus also includes a hand-cranked drive mechanism for manually moving the film to center the selected frame relative to the raster, and for "browsing" from one frame to another.

The raster can be collapsed for occasional brief examination of a single frame of a movie sequence without deleterious effect on the screen of the cathode-ray tube, but if it were collapsed for long periods of viewing still frames–as would be the case of an educational film consisting predominantly of stills–there would be greater fatigue over that portion of the screen, resulting in a differential in brightness between the center portion and the top and bottom portions of the reproduced pictures. To prevent this potential aging of the center portion of the screen, the still frames 28 are twice as high as the movie sequence frames so as to permit scanning by the full-sized raster. To prevent collapse of the scan normally resulting from manual actuation of the STILL button, the solenoid and the STILL button are so arranged that when the latter is pulled down by the solenoid a second switch, which negates the raster collapse, is actuated. More particularly, when the STILL button (shown in its unoperated position in FIG. 1) is manually depressed it actuates a switch $S_2$, the function of which is to stop the film drive and collapse the scan. As noted earlier, the STILL button is of the type that locks in the depressed position until released by pushing the button a second time. In accordance with the invention, the scan-collapsing function is overridden by the switch $S_1$ which is actuated when the STILL button is pulled down by the solenoid. To this end, the armature 58*a* is provided with an arm 58*b* which upon actuation of the solenoid engages a protrusion 59*a* on the shaft of button 59 to pull the button down sufficiently to close switch $S_2$. At the same time arm 58*b* engages a toggle 70 pivotally mounted between the arm 58*b* and the protrusion 59*a* which operates the multicontact switch $S_1$. One of the sets of contacts of the switch is opened to remove the 60 Hz. power from the film drive 26, and a second set is closed to override the action of switch $S_2$ so as to maintain the raster at full size. Upon subsequent manual release of the button, switch $S_2$ opens and the protrusion 59*a* returns the toggle 70 and the contacts of switch $S_1$ to their normal positions. Thus, when the film is automatically stopped for viewing a still frame, a raster of the proper size for scanning a double-sized frame is also automatically present.

As an aid to the operator or user of the system in smoothly presenting the information contained on the film, the final picture in a still sequence (e.g., the frame at the left end in FIG. 1) preferably has an indication to that effect, such as the word "RESTART", recorded thereon to signal the operator to return the playback apparatus to the movie playback mode.

From the foregoing it is seen that applicants have provided a relatively simple and inexpensive system for automatically stopping a moving film, in a very short time following a motion picture sequence, to view a still frame of twice the vertical height of the movie frames. Although the invention has been described with reference to the specific film format for which it was designed, it will be recognized that the technique is applicable to a film format consisting of a single succession of frames, for example, with the windows 30 positioned along an edge; indeed, even in the format illustrated in FIG. 1, they might be positioned along a different lengthwise strip on the film. Also, instead of positioning the marks between a succession of movie sequence frames containing unanimated subject matter, these frames may be left blank if desired, or the sequences of marks 30 may be placed adjacent the final three or four pairs of frames of a movie sequence to permit the still frame to immediately follow the movie sequence.

We claim:

1. A monochrome record medium for the reproduction of intermixed movie and still picture information using television scanning techniques, comprising:

an elongated thin strip of transparent material having disposed thereon at least one longitudinal succession of mutually adjacent frames, the frames of a portion of said succession containing monochrome representations of video information and together constituting a motion picture sequence, and at least one other frame following said portion containing a monochrome representation of a still picture, and a longitudinal strip adjacent said succession of frames which is relatively opaque except for transparent synchronizing marks, each having a predetermined longitudinal position relative to a corresponding frame, said strip in the portion adjacent a predetermined number of frames immediately preceding said still frame having a multiplicity of additional similar synchronizing marks thereon which when optically sensed while the record medium is in continuous motion for reproduction of said motion picture sequences produces a signal of predetermined frequency to which the reproduction apparatus is responsive to stop the motion of said record medium to permit viewing of said still frame.

2. A record medium according to claim 1 having two successions of frames disposed thereon aligned in laterally displaced relation, and in which said longitudinal strip is positioned intermediate said two successions of frames.

3. A record medium according to claim 2 wherein frames containing a representation of a still picture have a dimension lengthwise of the record medium twice that of the frames constituting the motion picture sequence.

4. A record medium according to claim 3 wherein said two successions of frames contain independent programs each comprised of intermixed motion picture sequences and still picture sequences, and wherein said strip in the portion adjacent a predetermined number of frames immediately preceding the first still frame in each still picture sequence in the first of said successions has a first multiplicity of additional similar synchronizing marks thereon and in the portion adjacent a predetermined number of frames immediately preceding the first still frame in each still picture sequence in the second of said successions has a second different multiplicity of additional similar synchronizing marks thereon.

5. A record medium according to claim 3 wherein a predetermined number of frames of the same size as the motion picture sequence frames are disposed between the final frame of said portion constituting a motion picture sequence and the frame containing a still picture, and wherein said multiplicity of synchronizing marks is positioned on the portion of said longitudinal strip encompassed by said predetermined number of frames.

6. A record medium according to claim 5 wherein said predetermined number of frames contain alphanumeric information identifying the still picture to follow.

7. A record medium according to claim 5 wherein said predetermined number of frames contain no information.

8. In apparatus for reproducing information recorded on a record strip in at least one succession of frames containing motion picture information in a form suitable for reproduction using television scanning techniques in cooperation with continuous movement of the record medium through a scanning zone at a predetermined rate, and at least one other frame following said succession containing still picture information in a form suitable for reproduction using the aforesaid scanning techniques with the record medium stopped, said record medium having associated therewith a lengthwise strip including on a portion thereof immediately preceding said still picture frame a multiplicity of synchronizing marks per frame, the combination of:

means operative when energized for continuously moving said record strip through a scanning zone at said predetermined rate, means for directing a radiant energy beam in the path of the synchronizing marks during movement of the strip, detection means responsive to the radiant energy beam modified by the multiplicity of synchronizing marks for producing a pulse train having a repetition frequency determined by the lengthwise spacing of said marks and said predetermined rate of motion of the record strip, and frequency selective circuit means operative in response to said pulse train to deenergize said record strip moving means and to stop the strip following reproduction of said motion picture information to permit scanning said frame containing still picture information.

9. Apparatus according to claim 8 including a solenoid operative when energized to deenergize said record medium driving means, and wherein said circuit means includes a circuit selectively resonant at said repetition frequency or at another repetition frequency different therefrom and operative to generate an energizing signal for said solenoid.

* * * * *

PO-1050
(5/69)

UNITED STATES PATENT OFFICE
CERTIFICATE OF CORRECTION

Patent No. 3,627,922 Dated December 14, 1971

Inventor(s) Peter C. Goldmark and Abraham A. Goldberg

It is certified that error appears in the above-identified patent and that said Letters Patent are hereby corrected as shown below:

Col. 1, line 48, "766,137" should be --776,137--;
Col. 3, line 71, following "sequence" insert --which precedes them. The frames separating the movie sequence--;
Col. 3, line 72, "bright" should be --bring--;
Col. 5, line 9, "Q-multiplier"should be -- "Q" multiplier" --.
Col. 5, line 28, "grain" should be --train--.

Signed and sealed this 6th day of March 1973.

(SEAL)
Attest:

EDWARD M.FLETCHER,JR.
Attesting Officer

ROBERT GOTTSCHALK
Commissioner of Patents